United States Patent [19]

Kuroda

[11] 4,320,913
[45] Mar. 23, 1982

[54] SHOCK ABSORBING BUMPER FOR VEHICLES

[76] Inventor: Shigeharu Kuroda, 1-13 Tomigaoka 5-chome, Nara, Japan

[21] Appl. No.: 88,817

[22] Filed: Oct. 26, 1979

[51] Int. Cl.³ .............................................. B60R 21/14
[52] U.S. Cl. ................................ 293/120; 293/122; 293/149
[58] Field of Search ............... 293/110, 120, 121, 122, 293/102, 149; 52/716, 717, 718

[56] References Cited

U.S. PATENT DOCUMENTS

| | | | |
|---|---|---|---|
| 3,458,386 | 7/1969 | Shanok | 293/120 |
| 3,555,832 | 1/1971 | Narabu | 293/121 |
| 3,666,310 | 5/1972 | Burgess | 293/71 R |
| 3,690,710 | 9/1972 | Curran | 293/71 R |
| 3,734,557 | 5/1973 | McKenzie | 293/71 R |
| 3,829,141 | 8/1974 | Igwe | 293/71 R |
| 3,843,475 | 10/1974 | Kent | 52/716 |
| 3,902,748 | 9/1975 | Bank | 293/122 |
| 3,938,840 | 2/1976 | Haase | 293/71 P |
| 4,022,505 | 5/1977 | Saczawa | 293/120 |
| 4,076,296 | 2/1978 | Ditto | 293/122 |
| 4,134,610 | 1/1979 | Lindewall | 293/71 R |

Primary Examiner—Richard A. Bertsch
Assistant Examiner—John A. Carroll
Attorney, Agent, or Firm—Birch, Stewart, Kolasch & Birch

[57] ABSTRACT

A shock absorbing bumper for vehicles comprises an elongated bumper body which includes an outer layer formed of synthetic resin material by extrusion molding and an absorbing internal central bumper portion disposed internally of the outer layer, the internal central bumper portion has a plurality of axial bores and web portions.

14 Claims, 14 Drawing Figures

SHOCK ABSORBING BUMPER FOR VEHICLES

BACKGROUND AND SUMMARY OF THE INVENTION

This invention relates to a shock absorbing bumper for vehicles, and more particularly to such a bumper as made mainly of plastic material.

Various types of shock absorbing bumpers made of synthetic resin material have heretofore been proposed, for instance in U.S. Pat. Nos. 4,134,610 to Lindewall and 3,666,310 to Burgess et al. However, many of those conventional bumpers are of such a construction as does not permit production by continuous extrusion molding, resulting in a high manufacturing cost. Further, many of the conventional plastic or rubber made shock absorbing bumpers are common in such a basic idea that the major impact forces imposed on a vehicle bumper are absorbed mainly by the elastic property of an employed specific material such as foamed polyurethane or rubber, or by cushioning effect of fluid confined in an elongated chamber or a tube disposed within a bumper body, as disclosed, for example, in U.S. Pat. Nos. 3,690,710 to Curran, 3,829,141 to Igwe, 3,734,557 to McKenzie, and 3,938,840 to Haase et al in addition to the above referred U.S. Pat. Nos. 4,134,610 and 3,666,310. However, the idea of the present invention is distinguishable from the afore-discussed conventional idea in such a point that shock absorption is attained mainly by a specific, internal mechanical structure of a bumper body.

Accordingly, an object of the present invention is to provide a shock absorbing bumper formed mainly of synthetic resin material by continuous extrusion molding.

Another object of the invention is to provide a shock absorbing bumper which has an outer layer of synthetic resin material and an internal central bumper portion which includes a plurality of axial bores and web portions.

Other objects, features and advantages of the present invention will become more apparent from the following detailed description taken in connection with the accompanying drawings; it should be understood, however, that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
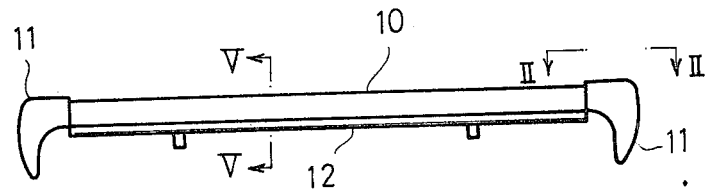
FIG. 1 is a schematic plan view showing a general construction of a shock absorbing bumper according to the present invention.

Referring now to the drawings, in particular to FIGS. 1 to 14, wherein each of the reference numerals without an alphabetic letter is used to generally indicate an element of the present invention, while each of reference numerals with a certain alphabetic letter is used to indicate a certain specific embodiment of the element generally indicated by the same reference numeral without any alphabetic letter. For example, reference numeral 10 is used to generally indicate an elongated bumper body of the invention, while each of reference numerals 10a, 10b, 10c, etc. is used to indicate each of the specific embodiments of the bumper body 10.

The shock absorbing bumper according to the present invention includes the elongated bumper body 10, a pair of end members 11 each of which is secured to a respective end of the bumper body 10 preferably by adhesive, and a metal support 12 on which the bumper body 10 is conventionally mounted.

The bumper body 10 has an outer layer 13 and an internal central bumper portion 14 which is disposed internally of said outer layer 13. The outer layer 13 may be formed of a suitable synthetic resin material such as polyethylene, polyvinyl chloride, polypropylene, nylon, acrylonitrile butadiene styrene (ABS), or fiberglass reinforced thermoplastics, by continuous extrusion molding and then cutting into pieces of a desired length.

The internal central bumper portion 14 has wide variations. For example, the central bumper 14 may be formed of the same semi-rigid, slightly elastic synthetic resin material of which the outer layer 13 is formed, by the same extrusion molding and cutting process, so that the outer layer 13 and the central bumper 14 are a single piece of an elongated integral body as particularly shown in FIGS. 5 to 11. Otherwise, the outer layer 13 may be formed on a prepared central bumper 14, as particularly shown in FIGS. 12 to 14. Further, the material of which the central bumper 14 is formed should not be limited to a synthetic resin, but aluminium or alloys thereof may be employed.

The central bumper 14 is characterized in that it includes a plurality of, preferably at least four, axial bores 15 extending through the entire length of the central bumper 14, and web portions 27 disposed among the axial bores 15. The number, size, shape in cross section, and distribution of the bores 14 and the web portions 27 may be varied in many ways as shown in various embodiments to be described hereinafter.

Figure 2:
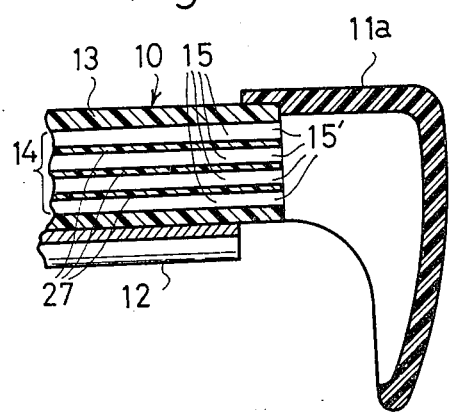
FIG. 2 is an enlarged, fragmentary, longitudinal section taken along the line II—II of FIG. 1.
Figure 3:
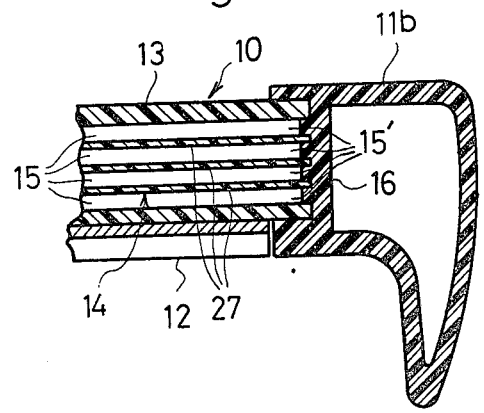
FIG. 3 is a similar view to FIG. 2, in which a modified end member is attached to a bumper body.
Figure 4:
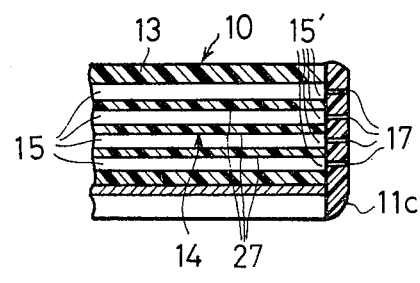
FIG. 4 is also a similar view to FIG. 2, in which a further modified end member is attached to the bumper body.

The end members 11 may be formed of a suitable synthetic resin material similar to or the same as the material of which the outer layer 13 is formed. The end member 11 may be formed into various constructions. For example, the end member 11a may be so constructed that the axial bores 15 of the central bumper 14 are not closed by any wall of the member 11a but are communicated with the atmosphere, as shown in FIG. 2. It is also possible to construct the member 11 so that, as shown in FIG. 3, a wall 16 thereof can hermetically seal the end openings 15' of each axial bore 15. Otherwise, as shown in FIG. 4, the member 11c may be formed with narrow holes 17 which are in communication with the axial bores 15 of the central bumper 14.

Figure 5:
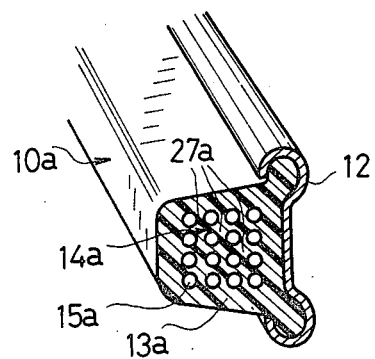
FIG. 5 is a fragmentary perspective view taken along the line V—V of FIG. 1, showing a sectional end of one embodiment of the bumper body.

FIG. 5 illustrates the first embodiment 10a of the bumper body 10, in which the outer layer 13a and the internal central bumper portion 14a are integrally formed of the same semi-rigid, slightly elastic synthetic resin material by continuous extrusion molding. The internal 14a is formed with a plurality of regularly disposed axial bores 15a of uniform size each of which is round in cross section. The internal 14a is further formed with web portions 27a among the bores 15a.

Figure 6:
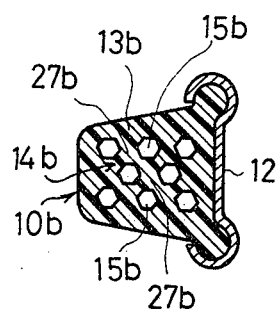
FIGS. 6 to 11 are end sections taken along the line V—V of FIG. 1, each showing a modification of the bumper body according to the present invention.

FIG. 6 shows the second embodiment 10b of the bumper body 10 in which the outer layer 13b and the central bumper portion 14b are also integrally formed of the same semi-rigid, slightly elastic synthetic resin material by extrusion molding. The central bumper 14b is formed with web portions 27b and a plurality of axial bores 15b each of which is hexagonal in cross section.

Figure 7:
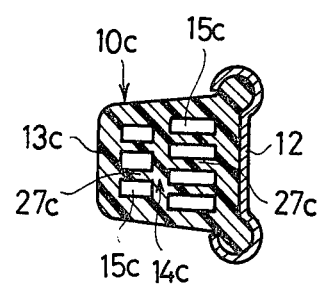

FIG. 7 shows the third embodiment 10c, in which the outer layer 13c and the central bumper 14c are also integrally formed of the same material by extrusion molding. The central bumper 14c is formed with web portions 27c and a plurality of axial bores 15c each of which is rectangular in cross section.

In the above described embodiments 10a, 10b, 10c, it is obvious that shapes in cross section of the axial bores 15a, 15b, 15c may be varied into various other shapes such as oval, triangular, square or other regular or irregular polygonal shapes.

Figure 8:
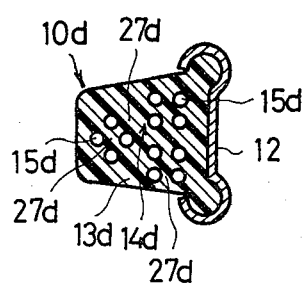

FIG. 8 shows the fourth embodiment 10d of the bumper body 10, in which the outer layer 13d and the internal 14d are also integrally formed of the same semi-rigid, slightly elastic synthetic resin material by extrusion molding. The axial bores 15d of the central bumper 14d are distributed in three groups. However, the number of the groups should not be limited to three but may be two, four or more. Further, the number of the bores 15d of each group may be varied in many ways. The central bumper 14d has web portions 27d disposed among the bores 15d.

Figure 9:
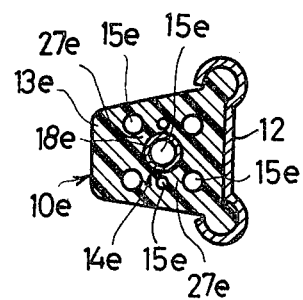

FIG. 9 illustrates the fifth embodiment 10e of the bumper body 10, in which the outer layer 13e and the central bumper 14d are also integrally formed of the same semi-rigid, slightly elastic synthetic resin material by extrusion molding. The internal 14e has web portions 27e and a plurality of axial bores 15e which are different in size. A reinforcing pipe 18e made of aluminium, aluminium alloy, or a rigid synthetic resin material extends through one or more of the bores 15e.

Figure 10:
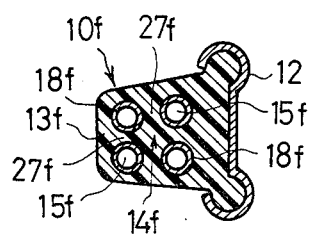

FIG. 10 shows the sixth embodiment 10f of the bumper body 10, in which the outer layer 13f and the central bumper 14f are also integrally formed of the same synthetic resin material by extrusion molding. The central bumper 14f has web portions 27f and a plurality of axial bores 15f. Each of the bores 15 is internally provided with a reinforcing pipe 18f made of aluminum or an aluminium alloy, or a rigid synthetic resin material.

Figure 11:
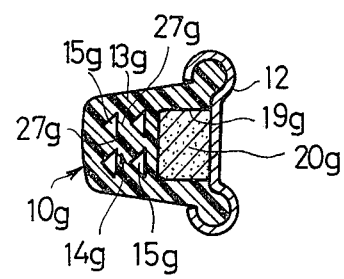

FIG. 11 shows the seventh embodiment 10g of the bumper body 10, in which the outer layer 13g and the central bumper 14g are also integrally formed of the same synthetic resin material by extrusion molding. The central bumper 14g includes web portions 27g and a plurality of axial bores 15g. Each of the bores 15g is triangular in cross section. If desired, the bumper body 10g may be further provided with an axial hollow space 19g which is filled with foamed plastic 20g such as foamed urethane.

Figure 12:
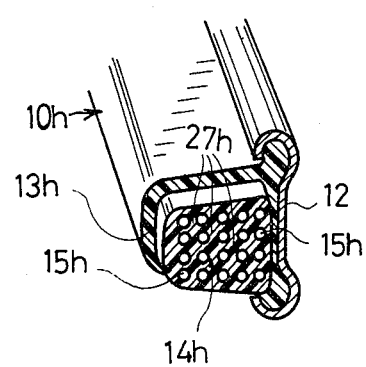
FIGS. 12 and 13 are similar view to FIG. 5, each showing a further modification of the bumper body of the present invention.

FIG. 12 illustrates an eighth embodiment 10h of the bumper body 10, in which the outer layer 13h is formed on a prepared central bumper 14h. In this embodiment, it is possible to form the outer layer 13h and the central bumper 14h from different materials. For example, the outer layer 13h may be formed of abrasion resisting synthetic resin such as polyethylene, while the central bumper 14h may be formed of somewhat hard and somewhat elastic material such as polyvinyle chloride or hard rubber. The central bumper 14h includes a plurality of axial bores 15h and web portion 27h.

Figure 13:
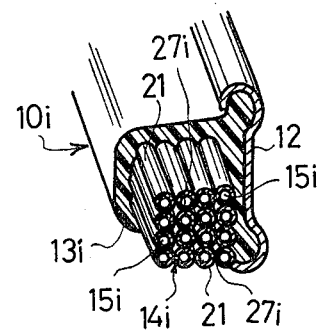

FIG. 13 shows the ninth embodiment 10i of the bumper body 10, in which the outer layer 13i and the central bumper 14i are formed by separate processes. The central bumper 14i is in the form of a bundle of pipes 21 each having an axial bore 15i. Each of the pipes 21 may be made of rigid or semi-rigid synthetic resin material or aluminum or an aluminum alloy. Walls of the pipes 21 cooperate to form web portions 27i of the central bumper 14i.

Figure 14:
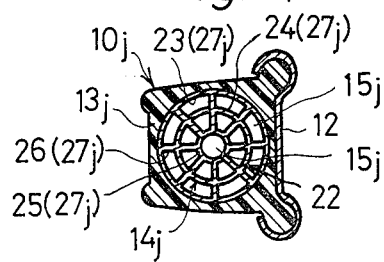
FIG. 14 is a similar view to each of FIGS. 6 to 11, but showing a still further modification of the bumper body of the invention.

FIG. 14 shows the tenth embodiment 10j of the bumper body 10, in which the outer layer 13j and the central bumper 14j are also formed by separate processes. The central bumper 14j is in the form of a tubular member 22 made of aluminum or an aluminum. The tubular member 22 has a framework including a plurality of concentric tubular walls 23, 24, 25 and a plurality of radially extending walls 26, providing a plurality of axial bores 15j defined by said walls 23, 24, 25 and 26 which serve as web portions 27j. It is readily apparent that the specific construction of the framework 22 may be varied in many ways.

In operaton, when impact forces are imposed on the bumper body 10, the outer layer 13 and the web portions 27 of the central bumper 14 cooperate to resist the impact forces. At the same time, the outer layer deforms, while the web portions 27 flex in view of the existence of the axial bores 15, thereby absorbing the impact forces to a certain extent. Further, owing to the specific structure of the central bumper 14 described hereinbefore, the impact forces imposed on the front wall of the bumper are gradually decreased before they are finally transmitted to the metallic support 12.

In case the end openings 15' of each axial bore 15 are hermetically sealed by the end members 11b as illustrated in FIG. 3, shock absorbing effect can be enhanced by the known air cushioning function of the air confined in the bore 14. This advantage can also be obtained to a certain extent by the embodiment shown in FIG. 4 in which the narrow holes 17 are formed in each of the end members 11c.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:

1. A shock absorbing bumper for vehicles comprising:
   an elongated bumper body;
   a pair of end members attached to opposite ends of said bumper body;
   a metal support for supporting said bumper body and serving as a secondary shock absorber;

said bumper body including an outer layer and an internal central bumper portion serving as a first shock absorber;

said outer layer being of one piece construction formed of synthetic resin material by a single process of extrusion molding so as to provide an equal cross section at every point along said bumper body;

said central bumper portion having a plurality of axial bores and web portions;

each of said axial bores having end openings and said bores extending through the entire length of said bumper body;

said web portions being disposed among said axial bores and extending through the entire length of said bumper body; and said metal support being formed by a bent sheet metal member so as to absorb shocks transmitted through said central bumper portion.

2. The bumper, as defined in claim 1, wherein said outer layer is formed on a prepared central bumper portion.

3. The bumper, as defined in claim 2, wherein said central bumper portion is formed of synthetic resin material different from synthetic resin material of which said outer layer is formed.

4. The bumper, as defined in claim 2, wherein said central bumper portion is in the form of a bundle of pipes made of rigid or semi-rigid synthetic resin and each having an axial bore, walls of said pipes cooperating to constitute web portions.

5. The bumper, as defined in claim 2, wherein said central bumper portion is in the form of a bundle of pipes made of aluminum or an aluminum alloy and each having an axial bore, walls of said pipes cooperating to constitute web portions.

6. The bumper, as defined in claim 2, wherein said central bumper portion is in the form of a framework which is made of aluminum or an alloy and provided with axial bores, walls of said framework constituting web portions.

7. The bumper, as defined in claim 1, wherein each of said axial bores is round in cross section.

8. The bumper, as defined in claim 1, wherein each of said axial bores is not round in cross section.

9. The bumper, as defined in claim 1, wherein at least one of said axial bores is different in size from remainder bores.

10. The bumper, as defined in claim 1, wherein at least one of said axial bores is different in cross sectional shape from remainder bores.

11. The bumper, as defined in claim 1, wherein at least one of said axial bores is internally provided with a reinforcing pipe extending through the bore.

12. The bumper, as defined in claim 1, wherein said bumper body is provided with an axial hollow space which is filled with foamed plastic material.

13. The bumper, as defined in claim 1, wherein said end openings of each of said axial bores are communicated with atmosphere.

14. The bumper, as defined in claim 1, wherein said end openings of each of said axial bores are hermetically sealed by said pair of end members.

* * * * *